US010592104B1

(12) United States Patent
Steptoe et al.

(10) Patent No.: US 10,592,104 B1
(45) Date of Patent: Mar. 17, 2020

(54) ARTIFICIAL REALITY TRACKPAD-BASED KEYBOARD

(71) Applicant: Facebook Technologies, LLC, Menlo Park, CA (US)

(72) Inventors: William Arthur Hugh Steptoe, London (GB); Jonathan Ravasz, London (GB); Michael James LeBeau, Brooklyn, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/004,073

(22) Filed: Jun. 8, 2018

(51) Int. Cl.
  *G06F 3/0488* (2013.01)
  *G06F 3/01* (2006.01)
  *G06F 3/0354* (2013.01)

(52) U.S. Cl.
  CPC .......... *G06F 3/04886* (2013.01); *G06F 3/011* (2013.01); *G06F 3/03547* (2013.01)

(58) Field of Classification Search
  CPC .. G06F 3/04886; G06F 3/011; G06F 3/03547; G02B 27/01; G02B 27/017; G06T 19/006; H04N 21/4312; H04N 21/42224
  See application file for complete search history.

(56) References Cited

U.S. PATENT DOCUMENTS

| | | | | |
|---|---|---|---|---|
| 2006/0007178 A1* | 1/2006 | Davis | .................. | G06F 3/04886 345/173 |
| 2012/0062465 A1* | 3/2012 | Spetalnick | ............ | G06F 3/0236 345/168 |
| 2013/0203495 A1* | 8/2013 | Yeh | ........................ | G06F 1/1626 463/37 |
| 2014/0253444 A1* | 9/2014 | Cheng | ................. | G06F 3/04883 345/158 |
| 2014/0320744 A1* | 10/2014 | Fan | ....................... | H04N 5/4403 348/563 |
| 2016/0062489 A1* | 3/2016 | Li | ........................ | G06F 3/03547 345/163 |
| 2017/0017393 A1* | 1/2017 | Luo | ..................... | G06F 3/04886 |
| 2017/0064373 A1* | 3/2017 | Kirby | ................. | H04N 21/4312 |
| 2017/0322623 A1* | 11/2017 | McKenzie | ............. | G06F 3/013 |
| 2019/0004694 A1* | 1/2019 | Lu | ......................... | G06F 3/0304 |

* cited by examiner

*Primary Examiner* — Sardis F Azongha
(74) *Attorney, Agent, or Firm* — Baker Botts L.L.P.

(57) ABSTRACT

In one embodiment, a method includes displaying a virtual keyboard at a first position within a virtual scene that is visible to a user through a display, detecting that the user touches a first point on a trackpad of a controller that is associated with the display, re-positioning, in response to the detection, the virtual keyboard from the first position to a second position, where the second position is determined based on the first point on the trackpad, and displaying, in response to the detection, a pointing indicator, where the pointing indicator is displayed on top of the virtual keyboard, and where the pointing indicator represents that an area of the virtual keyboard indicated by the pointing indicator is being pointed by the user.

20 Claims, 7 Drawing Sheets

ARTIFICIAL REALITY TRACKPAD-BASED KEYBOARD

TECHNICAL FIELD

This disclosure generally relates to Virtual Reality (VR) systems, and in particular related to taking human input in VR systems.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device in an artificial reality system may present a user a virtual keyboard that can be typed with a controller in an efficient, intuitive, and convenient way. The controller may be used as an input device in artificial reality applications. The controller may comprise a trackpad and one or more buttons, where the trackpad on the controller may be a type of pointing device that may be controlled by a user with a thumb or a stylus pen. When a user wants to type characters using a virtual keyboard, the user may use the trackpad to control the movement of a pointing indicator (equivalent to a cursor on the computer screen) over the keyboard. Because the trackpad is relatively small and the range of motion of a user's thumb is limited, the user may not be able to reach every key on the virtual keyboard in one motion. When the user types on the virtual keyboard using the trackpad, the user may need to scroll repeatedly to move between characters on the virtual keyboard, especially when the two characters are located far from each other on the keyboard. The computing device may move the virtual keyboard as the user moves her thumb on the trackpad to make typing on a virtual keyboard with a trackpad-based controller efficient, intuitive, and convenient. When a user's thumb moves in a direction toward a character that the user wants to reach, the computing device may move the trackpad-based keyboard in the opposite direction of the thumb movement. By doing this, the user may be able to reach the target character faster. As an example and not by way of limitation, when a user wants to type 'o' after she typed 'h,' her thumb may need to move to the upper-right direction on the trackpad. The computing device may move the keyboard to the lower-left direction as the thumb moves toward the upper-right direction to allow the user to reach 'o' within the range of motion afforded by the trackpad. In one embodiment, the computing device may map thumb positions on the trackpad to particular keyboard positions in a particular way so that all the keys on the keyboard can be reached by moving the thumb within the trackpad. When the user clicks a button on the controller, a character being pointed by the pointing indicator may be typed.

In particular embodiments, a computing device may receive a command from a user to display a virtual keyboard. The computing device may be a part of an artificial reality system, and the user may be using an artificial reality system. In particular embodiments, the command may be a pre-determined behavior of the user that implicitly indicates that the user is about to type. In particular embodiments, the command may be an explicit request from the user to display a virtual keyboard. The computing device, in response to the command from the user, may display the virtual keyboard at a first position within an artificial reality scene that is visible to a user through a display. The display may be connected to the computing device and present the artificial reality scene to the user. The artificial reality scene may comprise virtually created visual objects.

The computing device may detect that the user touches a first point on a trackpad of a controller. In particular embodiments, the user may touch the trackpad using a thumb. The controller may be associated with the display. The controller may be connected to the computing device. The controller may take input from the user and may deliver the input to the computing device. In response to the detection, the computing device may re-position the virtual keyboard from the first position to a second position. In particular embodiments, the second position may be determined based on the first point on the trackpad. The computing device may, in response to the detection, display a pointing indicator. The pointing indicator may be displayed on top of the virtual keyboard. The pointing indicator may represent that an area of the virtual keyboard indicated by the pointing indicator is being pointed by the user. In particular embodiments, the computing device may detect that the user moves the touch from the first point to a second point on the trackpad. In particular embodiments, the computing device may determine a direction from the first point to the second point on the trackpad. The computing device may calculate a distance between the first point and the second point on the trackpad. The computing device may re-position the virtual keyboard from the second position to a third position. A direction from the second position to the third position may be in the opposite direction from the first point to the second point on the trackpad. A distance between the second position and the third position may be proportional to the distance of the movement of touching. In particular embodiments, the computing device may determine a third position of the virtual keyboard based on the second point on the trackpad. A position of the virtual keyboard may be one-to-one mapped to a touch point on the trackpad. The computing device may re-position the virtual keyboard from the second position to the third position. The position of the pointing indicator may not change in relation to the surrounding environments. The location of the virtual keyboard indicated by the pointing indicator may change as the position of the virtual keyboard changes. In particular embodiments, the computing device may receive, from the controller, a signal for a click event.

The signal for the click event may be generated when the user clicks a button on the controller or when the user taps on the trackpad. The computing device may interpret the signal as a signal that a key on the virtual keyboard pointed by the pointing indicator is clicked.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
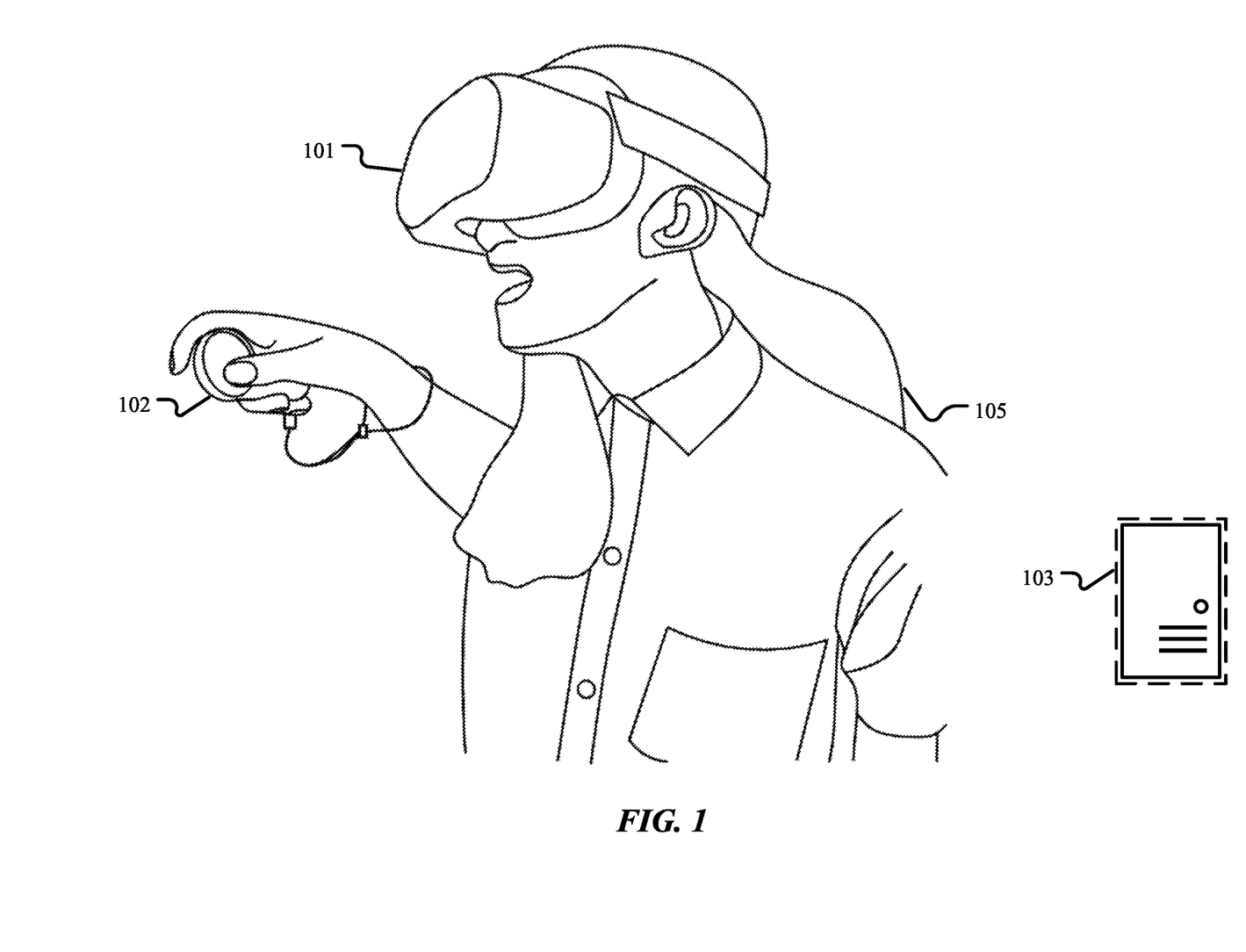
FIG. 1 illustrates an example artificial reality system.

FIG. 1 illustrates an example artificial reality system. Artificial reality is a form of reality that has been adjusted in some manner before presentation to a user 105, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The example artificial reality system illustrated in FIG. 1 may comprise a head-mounted display (HMD) 101, a controller 102, and a computing device 103. A user 105 may wear a head-mounted display (HMD) 101 that may provide visual artificial reality content to the user 105. The HMD 101 may include an audio device that may provide audio artificial reality content to the user 105. A controller 102 may comprise a trackpad and one or more buttons. The controller 102 may receive input from the user 105 and relay the input to the computing device 103. The controller 102 may also provide haptic feedback to the user 105. The computing device 103 may be connected to the HMD 101 and the controller 102. The computing device 103 may control the HMD 101 and the controller 102 to provide the artificial reality content to the user and receive input from the user 105. The computing device 103 may be a standalone host computer system, combined with the HMD 101, a mobile device, or any other hardware platform capable of providing artificial reality content to one or more users 105 and receive input from the users 105.

In particular embodiments, a computing device 103 in an artificial reality system may present a user 105 a virtual keyboard that can be typed with a controller 102 in an efficient, intuitive, and convenient way. The controller 102 may be used as an input device in artificial reality applications. The controller 102 may comprise a trackpad and one or more buttons, where the trackpad on the controller 102 may be a type of pointing device that may be controlled by a user 105 with a thumb or a stylus pen. When a user 105 wants to type characters using a virtual keyboard, the user 105 may use the trackpad to control the movement of a pointing indicator (equivalent to a cursor on the computer screen) over the keyboard. Because the trackpad is relatively small and the range of motion of a user's thumb is limited, the user 105 may not be able to reach every key on the virtual keyboard in one motion. When the user 105 types on the virtual keyboard using the trackpad, the user 105 may need to scroll repeatedly to move between characters on the virtual keyboard, especially when the two characters are located far from each other. To make typing on a virtual keyboard with a trackpad-based controller 102 efficient, intuitive, and convenient, the computing device 103 may move the virtual keyboard as the user 105 moves her thumb on the trackpad. When a user's thumb moves in a direction toward a character that the user 105 wants to reach, the computing device 103 may move the trackpad-based keyboard in the opposite direction of the thumb movement. By doing this, the user 105 may be able to reach the target character faster. As an example and not by way of limitation, when a user 105 wants to type 'o' after she typed 'h,' her thumb may need to move to the upper-right direction on the trackpad. The computing device 103 may move the keyboard to the lower-left direction as the thumb moves toward the upper-right direction to allow the user 105 to reach 'o' within the range of motion afforded by the trackpad. In one embodiment, the computing device 103 may map thumb positions on the trackpad to particular keyboard positions in a particular way so that all the keys on the keyboard can be reached by moving the thumb within the trackpad. When the user 105 clicks a button on the controller 102, a character being pointed by the pointing indicator may be typed. Although this disclosure describes moving a virtual keyboard as a user moves a thumb on a trackpad in a particular manner, this disclosure contemplates moving a virtual keyboard as a user moves a thumb on a trackpad in any suitable manner.

In particular embodiments, a computing device 103 may receive a command from a user 105 to display a virtual keyboard. The computing device 103 may be a part of an artificial reality system, and the user 105 may be using an artificial reality system. In particular embodiments, the command may be a pre-determined behavior of the user 105 that implicitly indicates that the user 105 is about to type. In particular embodiments, the command may be an explicit request from the user 105 to display a virtual keyboard. The computing device 103, in response to the command from the user 105, may display the virtual keyboard at a first position within an artificial reality scene that is visible to a user 105 through a display 101. The display 101 may be connected to the computing device 103 and present the artificial reality scene to the user 105. The artificial reality scene may comprise virtually created visual objects. The computing device 103 may detect that the user 105 touches a first point on a trackpad of a controller 102. In particular embodiments, the user 105 may touch the trackpad using a thumb. The controller 102 may be associated with the display. The controller 102 may be connected to the computing device 103. The controller 102 may take input from the user and may deliver the input to the computing device 103. In response to the detection, the computing device 103 may re-position the virtual keyboard from the first position to a second position. In particular embodiments, the second position may be determined based on the first point on the trackpad. The computing device 103 may, in response to the detection, display a pointing indicator. The pointing indicator may be displayed on top of the virtual keyboard. The pointing indicator may represent that an area of the virtual keyboard indicated by the pointing indicator is being pointed by the user. In particular embodiments, the computing device 103 may detect that the user 105 moves the touch from the first point to a second point on the trackpad. In particular embodiments, the computing device 103 may determine a direction from the first point to the second point on the trackpad. The computing device 103 may calculate a distance between the first point and the second point on the trackpad. The computing device 103 may re-position the virtual keyboard from the second position to a third position. A direction from the second position to the third position may be in the opposite direction from the first point to the second point on the trackpad. A distance between the second position and the third position may be proportional to the distance of the movement of touching. In particular embodiments, the computing device 103 may determine a third position of the virtual keyboard based on the second point on the trackpad. A position of the virtual keyboard may be one-to-one mapped to a touch point on the trackpad. The computing device 103 may re-position the virtual keyboard from the second position to the third position. The position of the pointing indicator may not change in relation to the surrounding environments. The location of the virtual keyboard indicated by the pointing indicator may change as the position of the virtual keyboard changes. In particular embodiments, the computing device 103 may receive, from the controller 102, a signal for a click event. The signal for the click event may be generated when the user clicks a button on the controller or when the user taps on the trackpad. The computing device 103 may interpret the signal as a signal that a key on the virtual keyboard pointed by the pointing indicator is clicked.

In particular embodiments, a computing device 103 may receive a command from a user 105 to display a virtual keyboard. The computing device 103 may be a part of an artificial reality system, and the user 105 may be using an artificial reality system. In particular embodiments, the command may be a pre-determined behavior of the user 105 that implicitly indicates that the user 105 is about to type. In particular embodiments, the command may be an explicit request from the user 105 to display a virtual keyboard. As an example and not by way of limitation, a user 105 may be playing a Virtual Reality (VR) multi-user game using an artificial reality system. The user 105 may want to send a short message to another player. The user 105 may click a message icon using a controller 102. The controller 102 may deliver a signal that a button on the controller 102 is clicked to the computing device 103. The computing device 103 may receive the signal that the user 105 clicks the message icon. The computing device 103 may interpret the signal as a command to display an empty message box and a virtual keyboard. As another example and not by way of limitation, a user 105 may be using a VR application for experiencing a virtual museum. The user 105 may turn to look at a message board next to the entrance gate of the museum. The HMD 101 that the user 105 is wearing may detect that the user 105 is facing the message board and deliver a signal for the event to the computing device 103. The computing device 103 may determine that the user 105 is about to leave a message on the message board based on situational cues, such as the user 105 facing and staring the message board. The computing device 103 may interpret that the user 105 is staring the message board as a command to display a virtual keyboard. Although this disclosure describes receiving a command to display a virtual keyboard from a user in a particular manner, this disclosure contemplates receiving a command to display a virtual keyboard from a user in any suitable manner.

Figure 2:
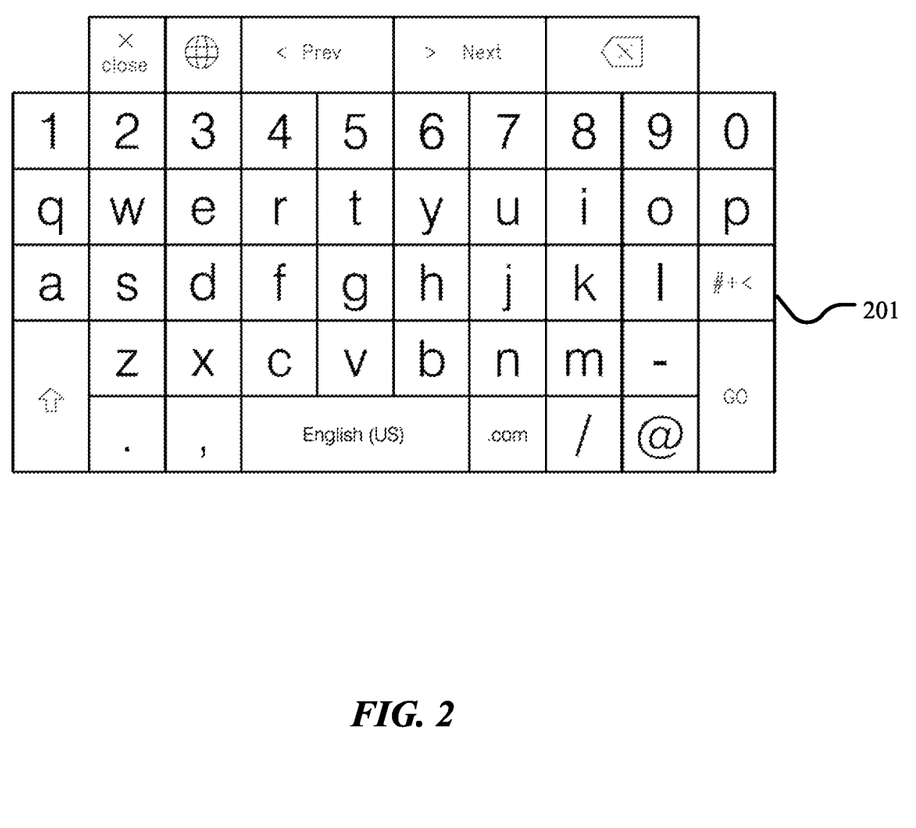
FIG. 2 illustrates an example virtual keyboard.

FIG. 2 illustrates an example virtual keyboard. In particular embodiments, the computing device 103, in response to receiving a command to display a virtual keyboard 201 from the user 105, may display the virtual keyboard 201 at a first position within an artificial reality scene that is visible to a user 105 through a display 101. The display 101 may be connected to the computing device 103 and may present the artificial reality scene to the user 105. The artificial reality scene may comprise virtually created visual objects. As an example and not by way of limitation, continuing with the prior example of playing a VR multi-user game, the computing device 103 may present a virtual keyboard 201 and an empty message box in front of the user 105 in the virtual reality scene. The user 105 may be able to see the virtual keyboard 201 and the empty message box through the HMD 101. When the user 105 types characters using the virtual keyboard 201, the typed characters may be presented in the message box. When the user 105 finishes typing, the user 105 may send the message to another user. Although this disclosure describes presenting a virtual keyboard to a user in a particular manner, this disclosure contemplates presenting a virtual keyboard to a user in any suitable manner.

Figure 3:
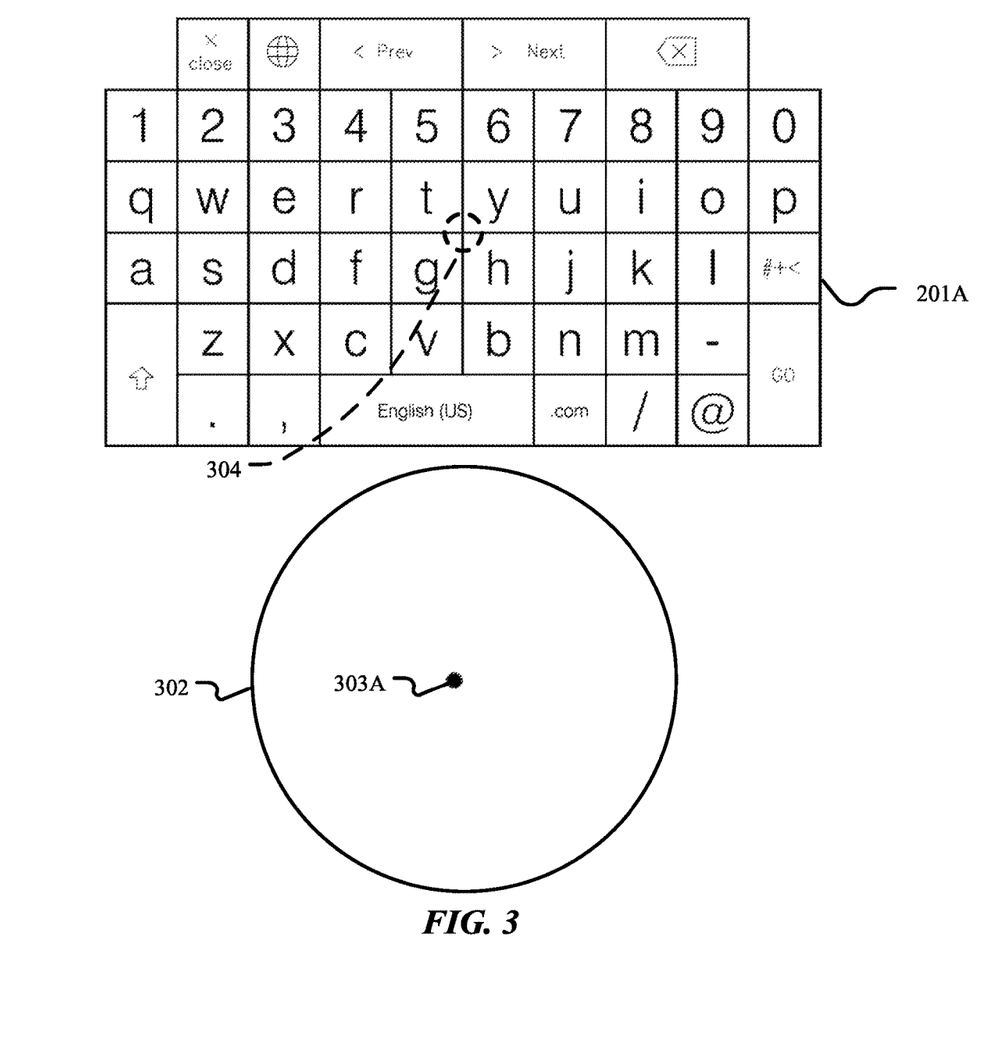
FIG. 3 illustrates an example re-positioning of the virtual keyboard based on an initial touch on the trackpad.

FIG. 3 illustrates an example re-positioning of the virtual keyboard based on an initial touch on the trackpad. In particular embodiments, the user 105 may touch a first point 303A of the trackpad 302 using a thumb (or any other finger). In particular embodiments, the user 105 may touch the first point 303A of the trackpad 302 using a stylus pen. The controller 102 may be associated with the display. The controller 102 may be connected to the computing device 103. The controller 102 may take input from the user and may deliver the user input to the computing device 103. The controller 102 may detect that the user touches the first point 303A of the trackpad 302, may generate a signal for the detected touch, and may deliver the signal to the computing device 103. The computing device 103 may determine that the user 105 touches a first point 303A on the trackpad 302 of the controller 102 based on the signal from the controller 102. As an example and not by way of limitation, continuing with the prior example, the user 105 may point the controller 102 toward the displayed virtual keyboard. The user may touch a point 303A on the trackpad 302 using her thumb to start typing on the virtual keyboard. The controller 102 may detect that the point 303A is touched, may generate a signal for the detected touch, and may deliver the signal to the computing device 103. The signal may comprise information that a touch occurred and information regarding coordinates of the point 303A within the trackpad 302 that was touched. On receiving the signal from the controller 102, the computing device 103 may detect that the user touched the point 303A on the trackpad 302 of the controller 102. Although this disclosure describes detecting a touch on a trackpad for a virtual keyboard in a particular manner, this disclosure contemplates detecting a touch on a trackpad for a virtual keyboard in any suitable manner.

In particular embodiments, the computing device 103 may re-position the virtual keyboard 201 from the first position to a second position 201A in response to the detection of a touch at a first point 303A on the trackpad. In particular embodiments, the computing device 103 may determine the second position based on the first point 303A on the trackpad. The computing device 103 may, in response to the detection, display a pointing indicator 304. The pointing indicator may be displayed on top of the virtual keyboard. The pointing indicator may represent that an area of the virtual keyboard indicated by the pointing indicator is being pointed by the user. The position of the pointing indicator may not change in relation to the surrounding environments. The position of the pointing indicator 304 may be right in front of the user 105. The area of the virtual keyboard indicated by the pointing indicator 304 may change as the position of the user's thumb on the virtual keyboard changes. The pointing indicator 304 may not be displayed when the user 105 is not touching the touchpad 302. As an example and not by way of limitation, the user may touch a center 303A of the touchpad 302 as illustrated in FIG. 3. The computing device 103 may not need to re-position the virtual keyboard 201 because a corresponding position of the virtual keyboard 201 to the center of the trackpad 302 may be identical to a default position of the virtual keyboard 201. The default position of the virtual keyboard 201 may be a position of the virtual keyboard 201 when the user 105 is not touching the trackpad. As another example and not by way of limitation, if the user 105 touches the upper-right point of the trackpad, the computing device 105 may re-position the virtual keyboard 201 so that its upper-right area is pointed to by the pointing indicator 304. Because the pointing indicator 304 does not move, the keyboard may need to move in the lower-left direction from the default position to make the pointing indicator 304 point to the upper-right area of the virtual keyboard 201. Although this disclosure describes re-positioning the virtual keyboard based on a detected initial touch in a particular manner, this disclosure contemplates re-positioning the virtual keyboard based on a detected initial touch in any suitable manner.

Figure 4:
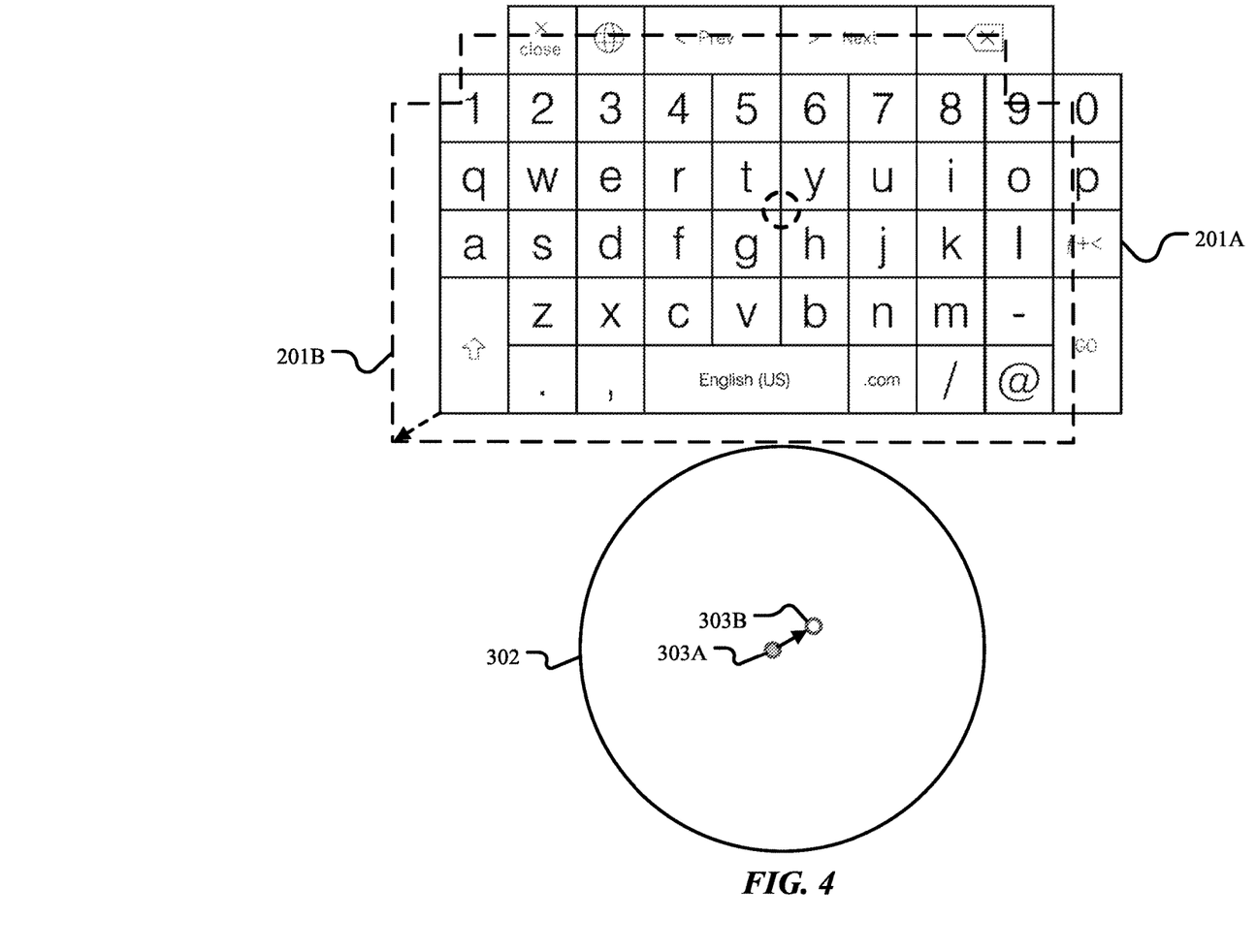
FIG. 4 illustrates an example re-positioning of the virtual keyboard based on a movement on the trackpad.

FIG. 4 illustrates an example re-positioning of the virtual keyboard based on a movement on the trackpad. After the user 105 touches the first point 303A of the trackpad 302, the user 105 may recognize what area of the virtual keyboard 201 is being pointed by the pointing indicator 304. The user 105 may want to point to a desired key on the virtual keyboard to click the desired key. FIG. 4 illustrate a scenario where the user 105 is moving her thumb on the trackpad in a direction toward the desired key. The user 105 may reach the second point 303B on the trackpad 302. The controller 102 may deliver one or more signals regarding the movement to the computing device 103. Based on the signals from the controller 102, the computing device 103 may detect that the user 105 moves the touch from the first point 303A to a second point 303B on the trackpad. The computing device 103 may determine a direction from the first point 303A to the second point 303B on the trackpad 302. The computing device 103 may calculate a distance between the first point 303A and the second point 303B on the trackpad 302. In response, the computing device 103 may re-position the virtual keyboard from the second position 201A to a third position 201B. The direction from the second position 201A to the third position 201B may be in the opposite direction from the first point 303A to the second point 303B on the trackpad 302. A distance between the second position 201A and the third position 201B may be proportional to the distance from the first point 303A to the second point 303B on the trackpad 302. As an example and not by way of limitation, a user initially touches a point close to the center of the trackpad 302. Because the touched point 303A is close to the center of the trackpad 302, the position 201A of the virtual keyboard is close to the default position of the virtual keyboard. The user 105 may want to type 'y' on the virtual keyboard. Because the pointing indicator 304 is positioned at an intersection of 't,' 'y,' 'g,' and 'h,' the user 105 may move her thumb a little in the upper-right direction to a position 303B. The controller 102 may detect the movement on the trackpad 302 and deliver one or more signals to the computing device 103. On detecting the movement based on the one or more signals from the controller 102, the computing device 103 may determine the direction of the movement and calculate the distance from the point 303A to the point 303B. The computing device 103 may re-position the virtual keyboard to an opposite direction of the thumb movement on the trackpad 302 from 303A to 303B. The distance between the previous position of the virtual keyboard 201A and the new position of the virtual keyboard 201B after re-positioning may be proportional to the distance between the first point 303A and the second point 303B. After the computing device 103 re-positions the virtual keyboard, the pointing indicator 304 may be on top of 'y' key. Although this disclosure describes re-positioning a virtual keyboard based on observed touch movement on the trackpad in a particular manner, this disclosure contemplates re-positioning a virtual keyboard based on observed touch movement on the trackpad in any suitable manner.

Figure 5:
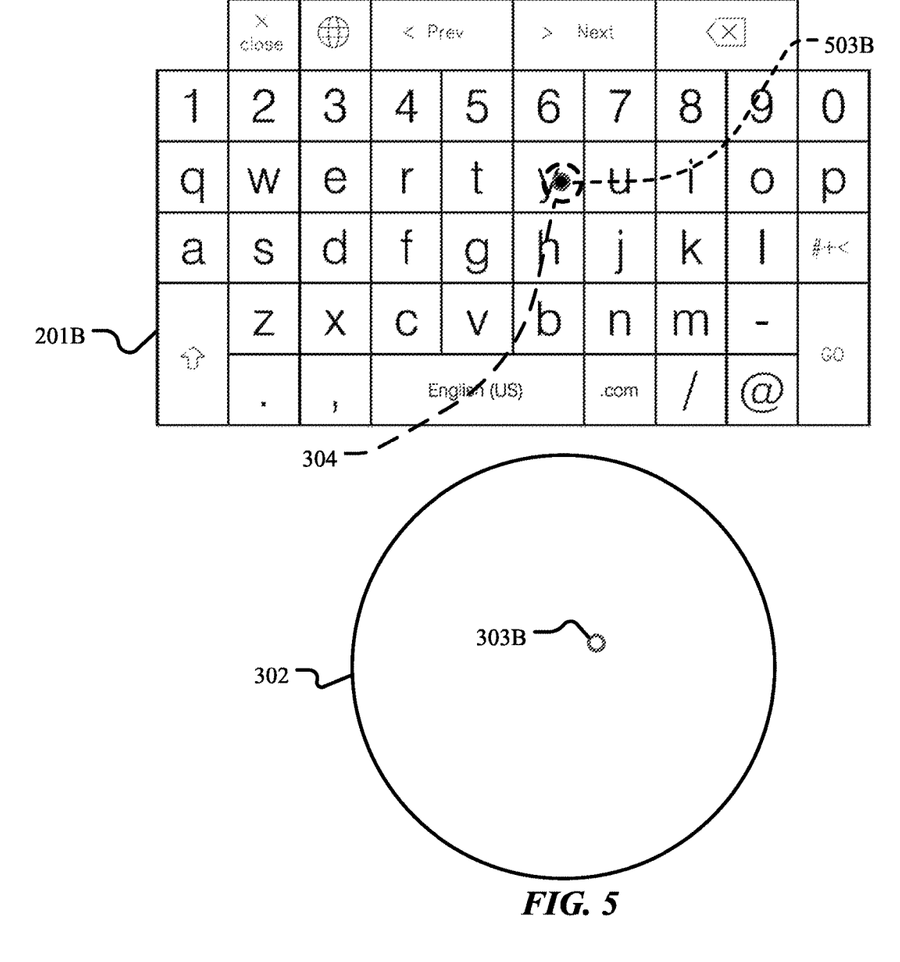
FIG. 5 illustrates an example re-positioning of the virtual keyboard based on a one-to-one mapping between a touch point on the trackpad and a pointed location on the virtual keyboard.

FIG. 5 illustrates an example re-positioning of the virtual keyboard based on a one-to-one mapping between a touch point on the trackpad and a pointed location on the virtual keyboard. In particular embodiments, the computing device 103 may detect that the user 105 moves the touch from the first point 303A to a second point 303B on the trackpad 302. In particular embodiments, the computing device 103 may determine a third position 201B of the virtual keyboard based on the second point 303B on the trackpad 302. The third position 201B of the virtual keyboard may result in a location 503B on the virtual keyboard being indicated by the pointing indicator 304, where a location on the virtual keyboard indicated by the pointing indicator 304 is one-to-one mapped to a point on the trackpad 302. In other words, a position of the virtual keyboard may be one-to-one mapped to a touch point on the trackpad. The computing device 103 may re-position the virtual keyboard from the second position 201A to the third position 201B. As an example and not by way of limitation, as presented in the prior example, a user initially touches a point close to the center of the trackpad 302. Because the touched point 303A is close to the center of the trackpad 302, the position 201A of the virtual keyboard is close to the default position of the virtual keyboard. The user 105 may want to type 'y' on the virtual keyboard. Because the pointing indicator 304 is positioned at an intersection of 't,' 'y,' 'g,' and 'h,' the user 105 may move her thumb a little in the upper-right direction to a position 303B. The controller 102 may detect the movement on the trackpad 302 and deliver one or more signals to the computing device 103. On detecting the movement based on the one or more signals from the controller 102, the computing device 103 may determine a position 201B of the virtual keyboard such that a location 503B on the virtual keyboard, one-to-one mapped to the point 303B on the touchpad 302, is indicated by the pointing indicator 304. While the user 105 moves the thumb on the trackpad 302, the computing device 103 may re-position the virtual keyboard 201 frequently so that the user 105 feels like the keyboard is moving in the opposite direction of the thumb movement. This approach may allow users to utilize muscle memory. A user may get familiar with the movement soon. Although this disclosure describes re-positioning of the virtual keyboard based on a one-to-one mapping between a touch point on the trackpad and a pointed location on the virtual keyboard in a particular manner, this disclosure contemplates re-positioning of the virtual keyboard based on a one-to-one mapping between a touch point on the trackpad and a pointed location on the virtual keyboard in any suitable manner.

In particular embodiments, the computing device 103 may receive, from the controller 102, a signal for a click event. A click event may occur when the user 105 clicks one of the one or more buttons of the controller 102. If the trackpad 302 is clickable, a click event may also occur when the user 105 clicks the trackpad 302. The controller 102 may detect the click event and deliver a signal for the click event to the computing device 103. The computing device 103 may interpret the received as a key on the virtual keyboard 201 pointed by the pointing indicator 304 is typed. As an example and not by way of limitation, the user 105 may move the thumb on the trackpad 302 to a point such that 'y' key on the virtual keyboard 201 is indicated by the pointing indicator 304. The user 105 may click one of the one or more buttons of the controller 102. On detecting the click event, the controller 102 may generate a signal indicating that a click event occurs and deliver the signal to the computing device 103. The computing device 103 may interpret the signal as indicating that 'y' on the virtual keyboard 201 is typed. Although this disclosure describes interpreting a click event as a typing event in a particular manner, this disclosure contemplates interpreting a click event as a typing event in any suitable manner.

Figure 6:
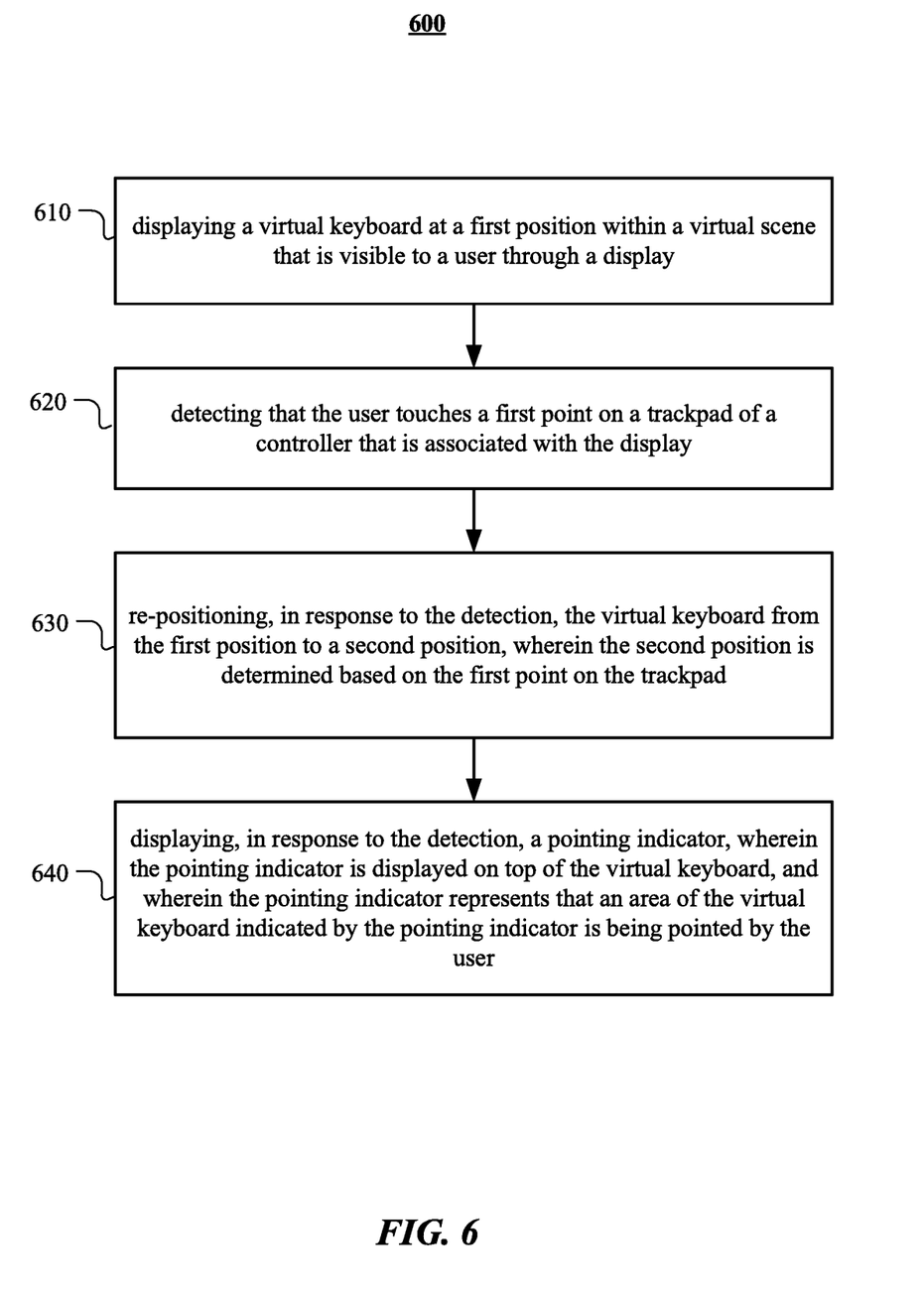
FIG. 6 illustrates an example method 600 for adjusting the position of a virtual keyboard based on a touch position on the trackpad.

FIG. 6 illustrates an example method 600 for adjusting the position of a virtual keyboard based on a touch position on the trackpad. The method may begin at step 610, where the computing device 103 may display a virtual keyboard at a first position within a virtual scene that is visible to a user through a display. At step 620, the computing device 103 may detect that the user touches a first point on a trackpad of a controller that is associated with the display. At step 630, the computing device 103 may re-position, in response to the detection, the virtual keyboard from the first position to a second position, wherein the second position is determined based on the first point on the trackpad. At step 640, the computing device 103 may display, in response to the detection, a pointing indicator, wherein the pointing indicator is displayed on top of the virtual keyboard, and wherein the pointing indicator represents that an area of the virtual keyboard indicated by the pointing indicator is being pointed by the user. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for adjusting position of a virtual keyboard based on a touch position on the trackpad including the particular steps of the method of FIG. 6, this disclosure contemplates any suitable method for adjusting position of a virtual keyboard based on a touch position on the trackpad including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
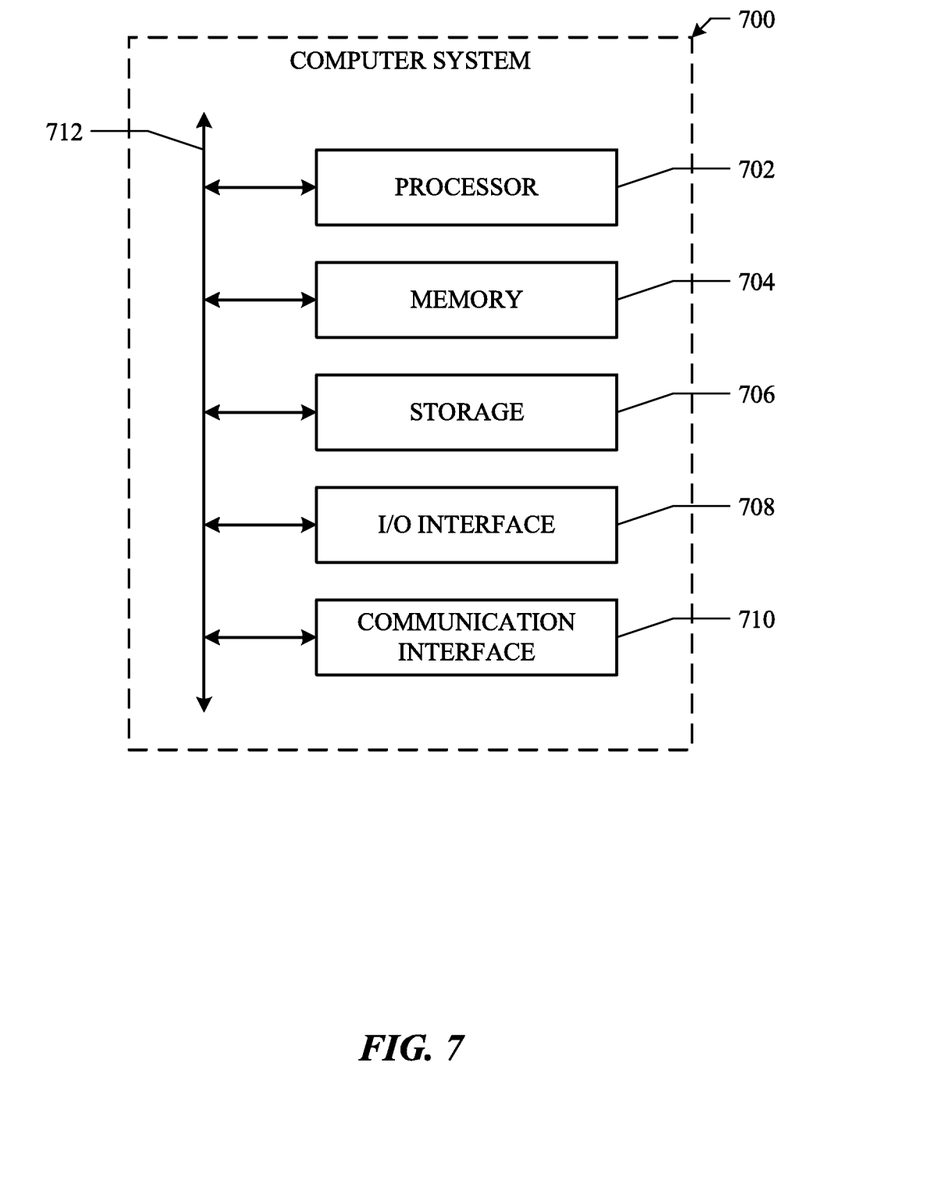
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
displaying a virtual keyboard at a first position within a virtual scene that is visible to a user through a display;
detecting that the user touches a first point on a trackpad of a controller that is associated with the display;
re-positioning, in response to the detection, the virtual keyboard from the first position to a second position, wherein the second position is determined based on the first point on the trackpad and a predetermined mapping between positions of the virtual keyboard and points on the trackpad; and
displaying, in response to the detection, a pointing indicator, wherein the pointing indicator is displayed on top of the virtual keyboard, and wherein the pointing indicator represents that an area of the virtual keyboard indicated by the pointing indicator is being pointed by the user.

2. The method of claim 1, wherein displaying the virtual keyboard is in response to a command from the user.

3. The method of claim 2, wherein the command is a pre-determined behavior of the user that implicitly indicates that the user is about to type.

4. The method of claim 1, wherein the display is connected to the computing device and presents virtually created visual objects to the user.

5. The method of claim 1, wherein the controller is connected to the computing device, and wherein the controller takes input from the user and delivers the input to the computing device.

6. The method of claim 1, wherein the trackpad is being touched by a thumb of the user.

7. The method of claim 1, further comprising:
detecting that the user moves the touch from the first point to a second point on the trackpad.

8. The method of claim 7, further comprising:
determining a direction from the first point to the second point on the trackpad;

calculating a distance between the first point and the second point on the trackpad; and re-positioning the virtual keyboard from the second position to a third position, wherein a direction from the second position to the third position is in an opposite direction from the first point to the second point on the trackpad, wherein a distance between the second position and the third position is proportional to the distance of the movement of touching.

9. The method of claim 7, further comprises:

determining a third position of the virtual keyboard based on the second point on the trackpad, wherein a position of the virtual keyboard is one-to-one mapped to a touch point on the trackpad; and re-positioning the virtual keyboard from the second position to the third position.

10. The method of claim 1, wherein a position of the pointing indicator does not change in relation to the surrounding environments, wherein the area of the virtual keyboard indicated by the pointing indicator changes as the position of the virtual keyboard changes.

11. The method of claim 1, further comprising:

receiving, from the controller, a signal for a click event; and interpreting the signal as a signal that a key on the virtual keyboard pointed by the pointing indicator is clicked.

12. The method of claim 11, wherein the signal for the click event is generated when the user clicks a button on the controller or when the user taps on the trackpad.

13. One or more computer-readable non-transitory storage media embodying software that is operable when executed to:

display a virtual keyboard at a first position within a virtual scene that is visible to a user through a display;

detect that the user touches a first point on a trackpad of a controller that is associated with the display;

re-position, in response to the detection, the virtual keyboard from the first position to a second position, wherein the second position is determined based on the first point on the trackpad and a predetermined mapping between positions of the virtual keyboard and points on the trackpad; and display, in response to the detection, a pointing indicator, wherein the pointing indicator is displayed on top of the virtual keyboard, and wherein the pointing indicator represents that an area of the virtual keyboard indicated by the pointing indicator is being pointed by the user.

14. The media of claim 13, wherein displaying the virtual keyboard is in response to a command from the user.

15. The media of claim 14, wherein the command is a pre-determined behavior of the user that implicitly indicates that the user is about to type.

16. The media of claim 13, wherein the display is connected to the computing device and presents virtually created visual objects to the user.

17. The media of claim 13, wherein the controller is connected to the computing device, and wherein the controller takes input from the user and delivers the input to the computing device.

18. The media of claim 13, wherein the trackpad is being touched by a thumb of the user.

19. The media of claim 13, wherein the software is further operable when executed to detect that the user moves the touch from the first point to a second point on the trackpad.

20. A system comprising:

one or more processors; and one or more computer-readable non-transitory storage media coupled to one or more of the processors and comprising instructions operable when executed by one or more of the processors to cause the system to:

display a virtual keyboard at a first position within a virtual scene that is visible to a user through a display;

detect that the user touches a first point on a trackpad of a controller that is associated with the display;

re-position, in response to the detection, the virtual keyboard from the first position to a second position, wherein the second position is determined based on the first point on the trackpad and a predetermined mapping between positions of the virtual keyboard and points on the trackpad; and display, in response to the detection, a pointing indicator, wherein the pointing indicator is displayed on top of the virtual keyboard, and wherein the pointing indicator represents that an area of the virtual keyboard indicated by the pointing indicator is being pointed by the user.

* * * * *